United States Patent [19]
Wagoner et al.

[11] Patent Number: 5,251,113
[45] Date of Patent: Oct. 5, 1993

[54] LANTERN FLOAT APPARATUS

[76] Inventors: Danny L. Wagoner, 1375 S. Garrison Chapel Rd., Bloomington, Ind. 47403; Timothy Honeycutt, 1721 Shawnee Dr., Ellettsville, Ind. 47429

[21] Appl. No.: 907,591

[22] Filed: Jul. 2, 1992

[51] Int. Cl.⁵ .............................................. F21V 21/00
[52] U.S. Cl. ...................................... 362/190; 362/253; 362/382; 441/13; 441/35; 441/136; 43/17.5; 43/55
[58] Field of Search ............... 362/158, 190, 253, 382; 441/13, 14, 16, 35, 36, 136; 114/343, 364; 43/17.5, 55, 56

[56] References Cited

U.S. PATENT DOCUMENTS

| | | | |
|---|---|---|---|
| 2,305,490 | 12/1942 | Perkins | 362/190 |
| 3,137,872 | 6/1964 | Edwards et al. | 441/14 |
| 3,307,208 | 3/1967 | Jacobson | 362/382 |
| 3,614,417 | 10/1971 | Sanford | 441/14 |
| 3,707,736 | 1/1973 | Bass | 441/13 |
| 4,553,194 | 11/1985 | Bailey | 441/13 |

*Primary Examiner*—Richard R. Cole
*Attorney, Agent, or Firm*—Leon Gilden

[57] ABSTRACT

A lantern float is arranged to attract fish, insects, and the like to enhance success of a fishing procedure. The organization includes a perimeter buoyant ring mounting a light transmissive support therewithin, with the support having a support ring to include a lantern positioned thereon. The invention may further be afforded with a reflective inverted cone mounted above the lantern utilizing various anchor structure associated with the ring support. A replacement illumination ring is provided in lieu of the lantern.

7 Claims, 7 Drawing Sheets

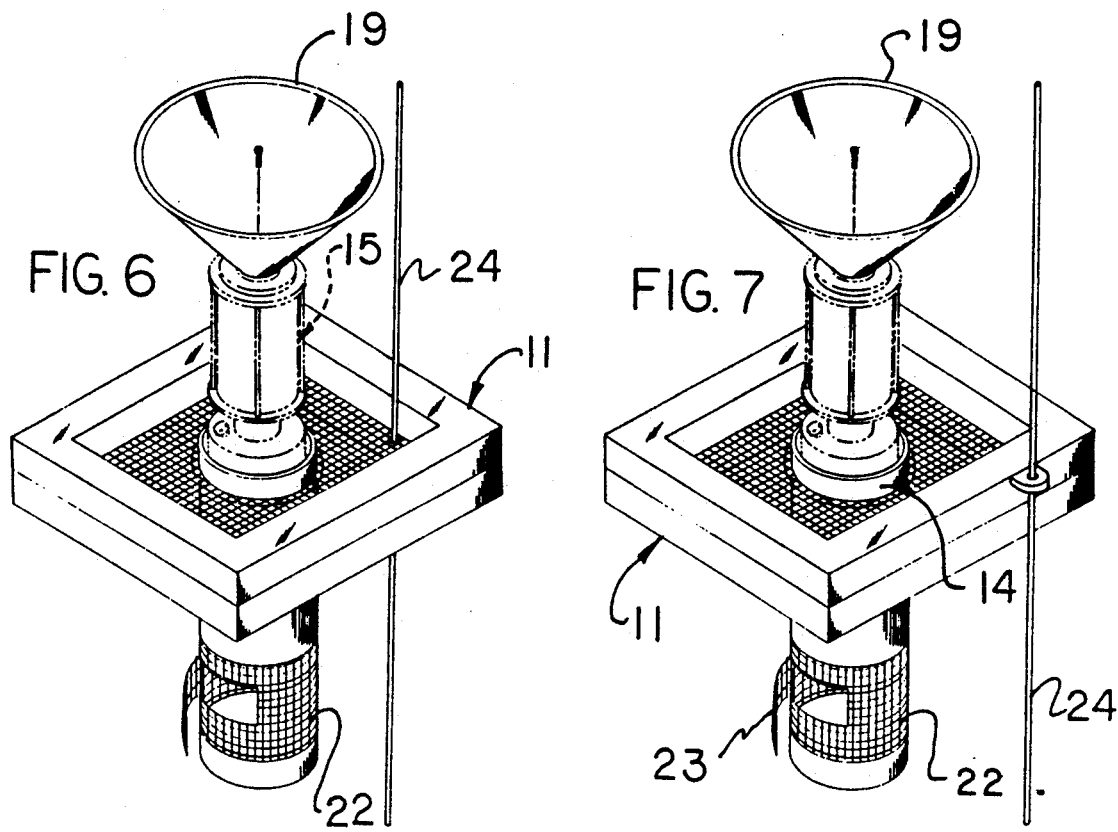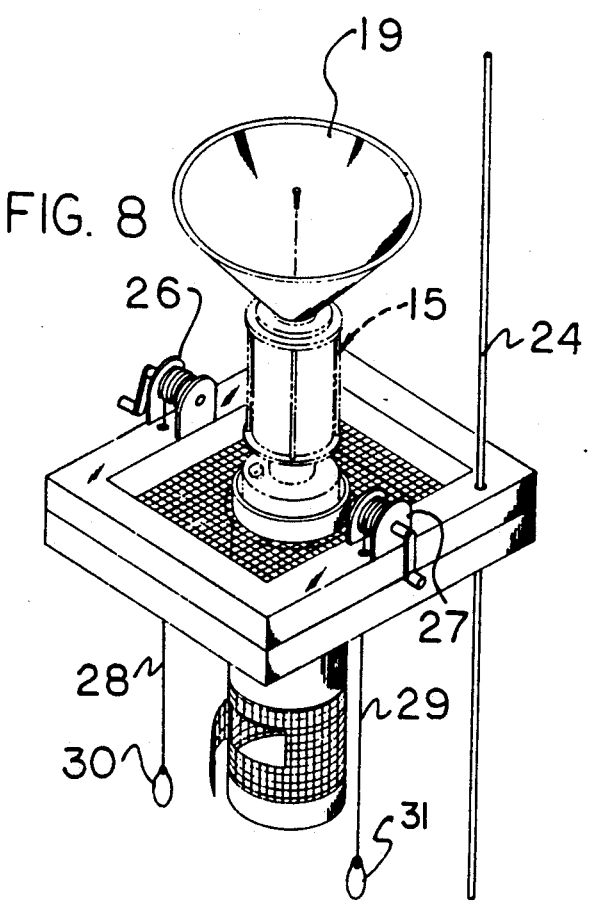

LANTERN FLOAT APPARATUS

BACKGROUND OF THE INVENTION

1. Field of the Invention

The field of invention relates to fishing apparatus, and more particularly pertains to a new and improved lantern float apparatus wherein the same is arranged to be floatatingly supported upon a body of water to attract fish and insects thereof.

2. Description of the Prior Art

Various illuminated members to be floatatingly supported upon a body of water are provided in the prior art and exemplified by U.S. Pat. No. 4,896,620 to Jones having an illuminated buoy structure.

U.S. Pat. No. 4,794,723 to Arnold has a floating bait bucket having a buoyant ring mounting an opaque support container therewithin.

U.S. Pat. No. 3,707,736 to Bass has a fisherman's lantern float having a support cup mounting a lantern thereon employing an underlying ballast.

As such, it may be appreciated that there continues to be a need for a new and improved lantern float apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fishing float apparatus now present in the prior art, the present invention provides a lantern float apparatus wherein the same is arranged to floatingly position a lantern medially of a light transmissive support surface of the float structure. As such, the general purpose of the present invention, which will be described subsequently in greater detail, is to provide a new and improved lantern float apparatus which has all the advantages of the prior art fishing apparatus and none of the disadvantages.

To attain this, the present invention provides a lantern float arranged to attract fish, insects, and the like to enhance success of a fishing procedure. The organization includes a perimeter buoyant ring mounting a light transmissive support therewithin, with the support having a support ring to include a lantern positioned thereon. The invention may further be afforded with a reflective inverted cone mounted above the lantern utilizing various anchor structure associated with the ring support. A replacement illumination ring is provided in lieu of the lantern.

My invention resides not in any one of these features per se, but rather in the particular combination of all of them herein disclosed and claimed and it is distinguished from the prior art in the particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lantern float apparatus which has all the advantages of the prior art fishing apparatus and none of the disadvantages.

It is another object of the present invention to provide a new and improved lantern float apparatus which may be easily and efficiently manufactured and marketed.

It is a further object of the present invention to provide a new and improved lantern float apparatus which is of a durable and reliable construction.

An even further object of the present invention is to provide a new and improved lantern float apparatus which is susceptible of a low cost of manufacture with regard to both materials and labor, and which accordingly is then susceptible of low prices of sale to the consuming public, thereby making such lantern float apparatus economically available to the buying public.

Still yet another object of the present invention is to provide a new and improved lantern float apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 6, 7, and 8 are isometric illustrations of the organization employing various anchor structure therewith.

DESCRIPTION OF THE PREFERRED EMBODIMENT

Figure 1:
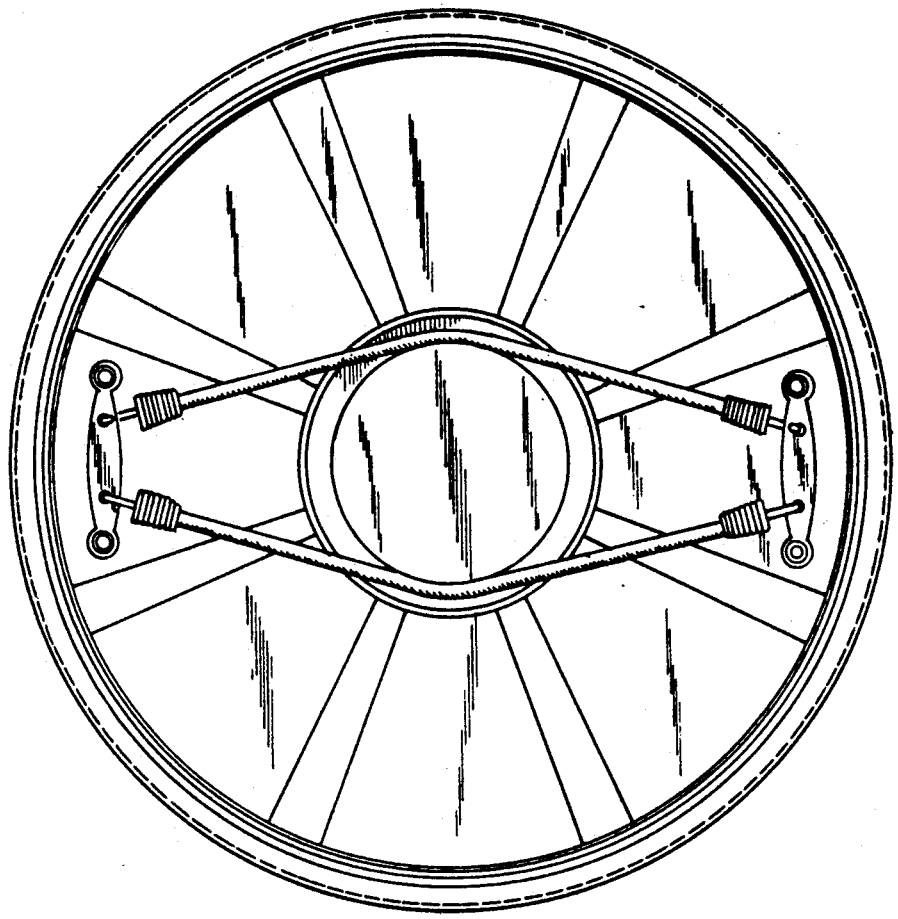
FIG. 1 is an orthographic top view of a prior art lantern float structure as exemplified in U.S. Pat. No. 3,707,736.

With reference now to the drawings, and in particular to FIGS. 1 to 11 thereof, a new and improved lantern float apparatus embodying the principles and concepts of the present invention and generally designated by the reference numeral 10 will be described.

Figure 2:
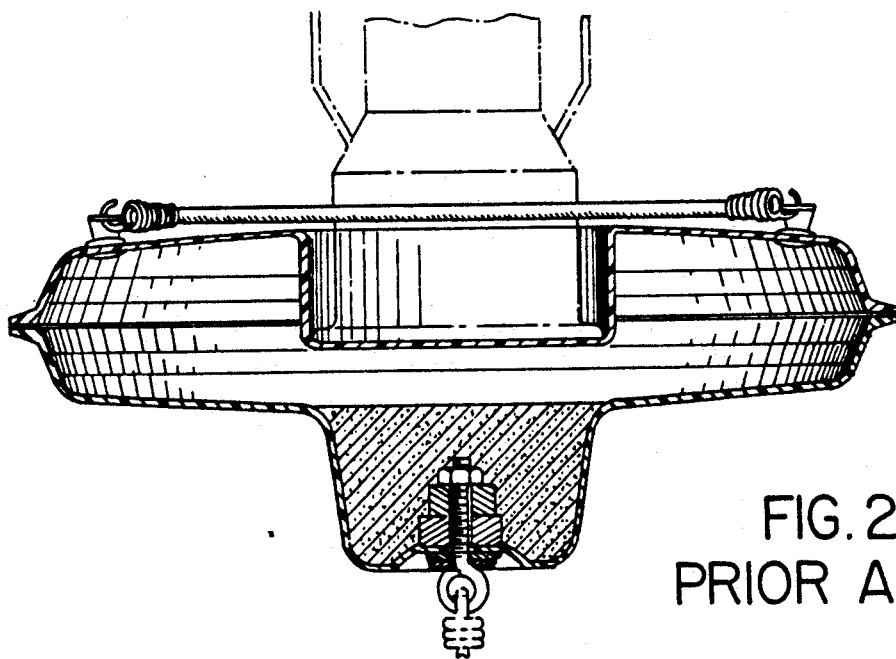
FIG. 2 is an orthographic cross-sectional illustration of the lantern float structure as set forth in FIG. 1.
Figure 3:
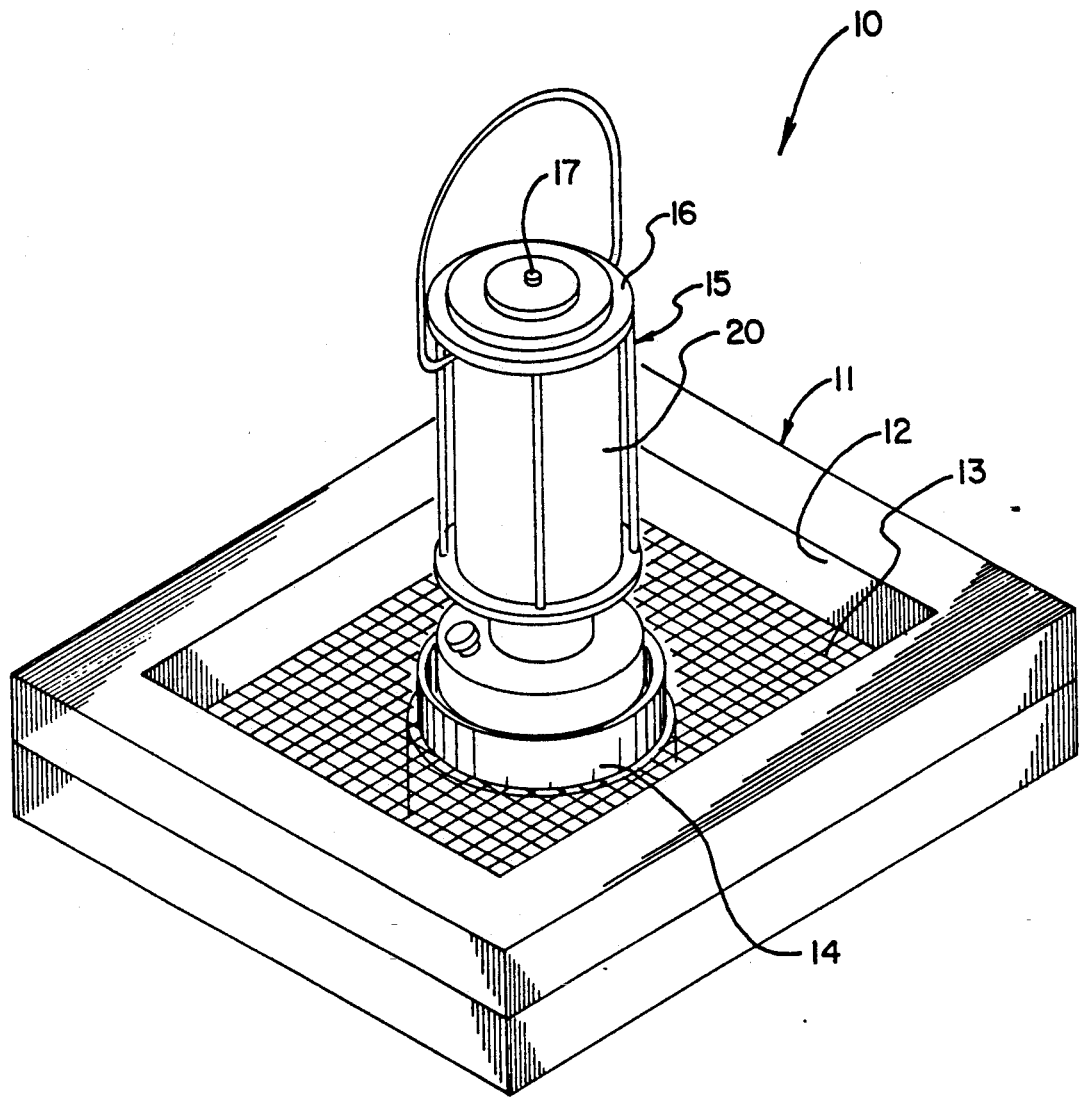
FIG. 3 is an isometric illustration of the instant invention.

The FIGS. 1 and 2 illustrate the prior art lantern float structure as set forth in U.S. Pat. No. 3,707,736 illustrating the opaque support plate structure mounting the lantern medially thereof.

Figure 4:
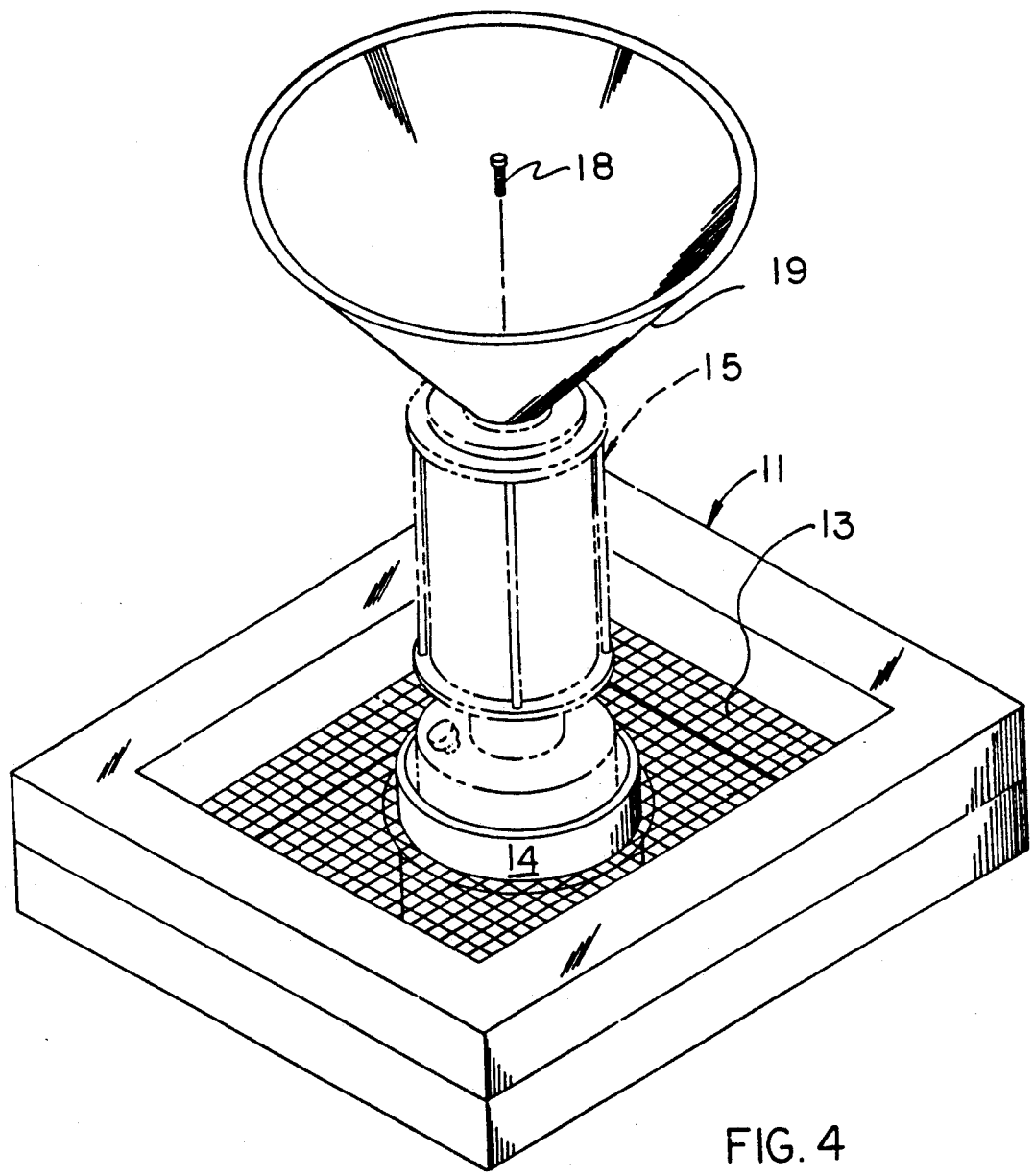
FIG. 4 is an isometric illustration illustrating the use of a reflector surface mounted to an upper end of the lantern.

More specifically, the lantern float apparatus 10 of the instant invention essentially comprises a buoyant frame 11 having a continuous frame interior wall 12 mounting a mesh grid 13 orthogonally and medially of the interior wall coextensively within the frame 11. A cylindrical support mount 14 of tubular construction is fixedly mounted medially of the mesh grid 13 positioning a lantern 15 therewithin. The lantern 15 includes a lantern top wall 16 having a top wall mounting bore 17. The FIG. 4 illustrates the use of an inverted conical reflector 19 having an outer reflective surface positioned over the lantern's lens 20 to effect reflection of the lantern towards a body of water supporting the apparatus 10. As illustrated, the use of a mounting fastener 18 directed through a lower distal end of the reflector 19 is received within the mounting bore 17 to secure the reflector to the lantern's top wall 16.

Figure 5:
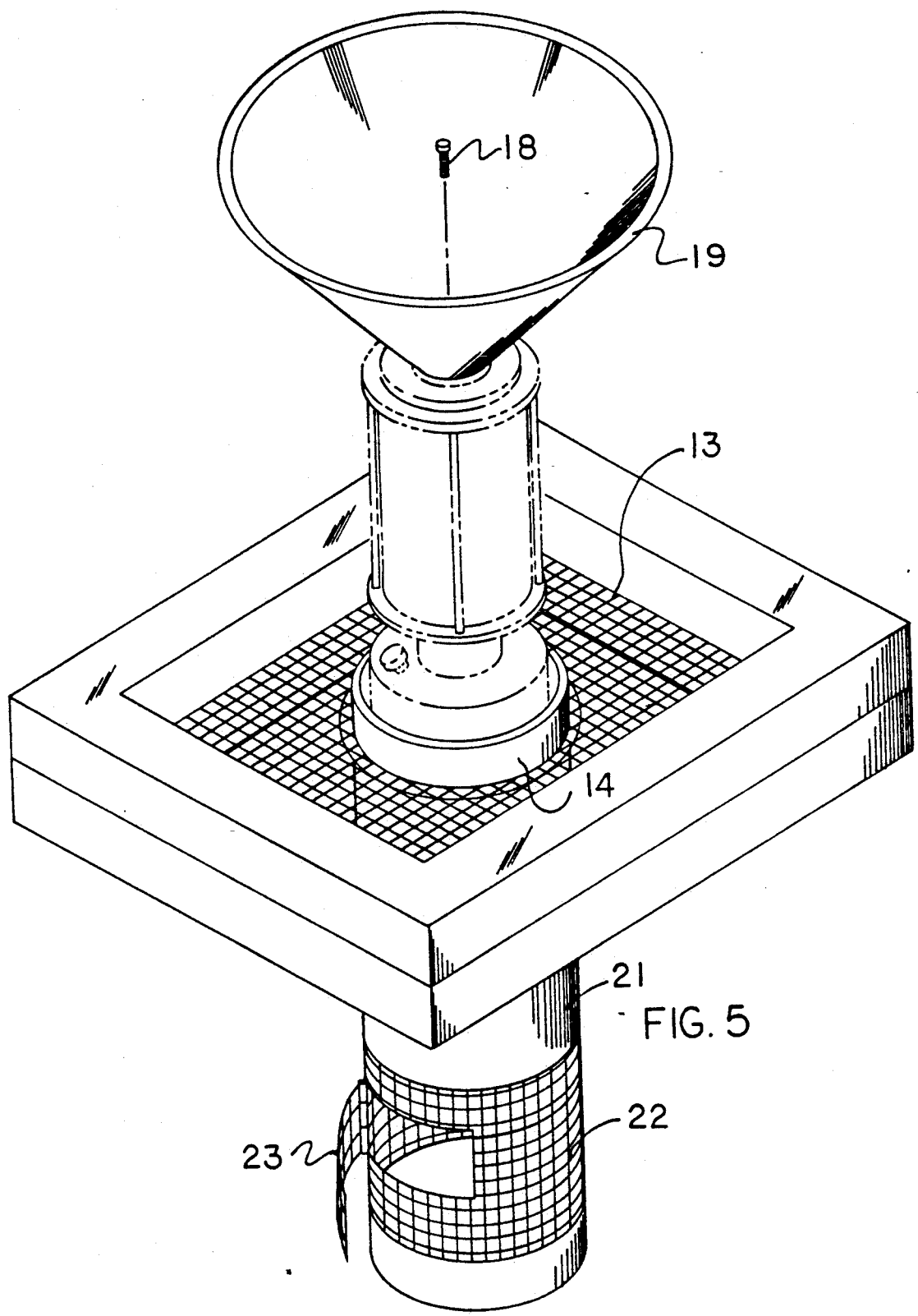
FIG. 5 is an isometric illustration of the organization employing a bait bucket coaxially aligned with the lantern structure.

The FIG. 5 illustrates the use of a support tube 21 positioned below the mesh grid 13 having a mesh basket 22 that is coaxially aligned relative to the lantern 15 and the support mount 14. A mesh basket door 23 permits access into the basket for storage of bait and the like therewithin in use of the organization.

The FIGS. 6 and 7 illustrate the use of a rigid anchor post 24 when utilizing the organization within shallow bodies of water such as lakes and the like to properly and fixedly secure the organization. The support post may be positioned through the grid 13, a tab positioned exteriorly of the framework, or as illustrated in FIG. 8 directed through the buoyant frame 11. The buoyant frame 11 is also provided with at least one and preferably a plurality of support wheels set forth as a first and second support wheel 26 and 27 having respective first and second anchor lines 28 and 29, each including respective first and second anchor members 30 and 31 at lower distal ends of the anchor lines to provide for positioning of the organization utilizing the anchor members when the organization is utilized in bodies of waters of greater depth to prevent utilization of the anchor post 24.

Figure 9:
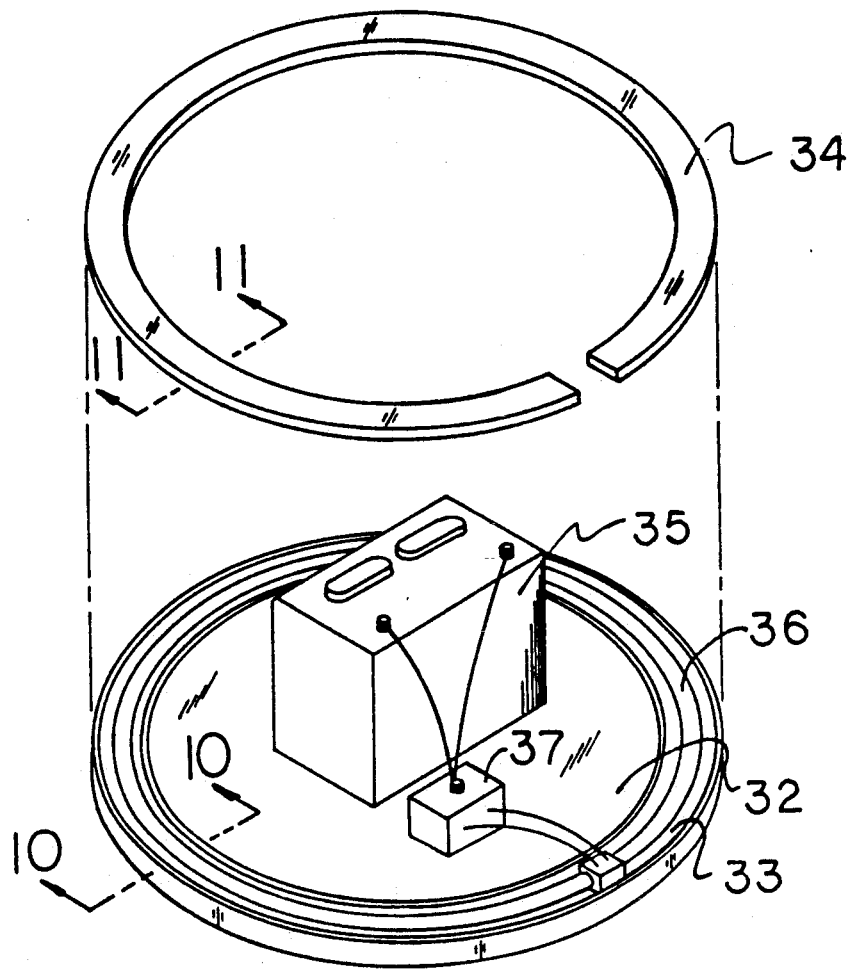
FIG. 9 is an isometric illustration of a replacement illumination ring utilized by the invention.
Figure 10:
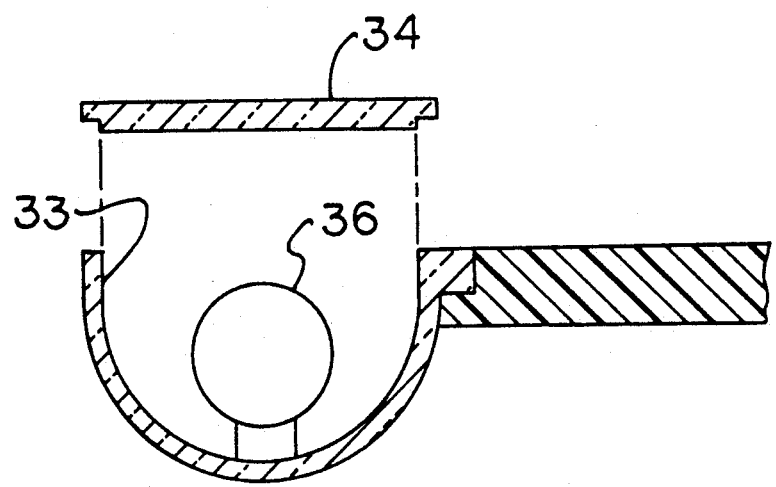
FIG. 10 is an orthographic view of FIG. 9, taken along the lines 10—13 in the direction indicated by the arrows.

The FIGS. 9 and 10 illustrate the use of an alternative illumination structure arranged for positioning within the support mount 14. The illumination structure includes a support plate 32 having a peripheral transparent trough wall 33 mounting a circular bulb 36 therewithin. The bulb 36 is operative through a battery 35 and a switch 37 to effect selective illumination of the bulb with a trough lid 34, also of transparent construction mounted to a top wall of the trough to permit directing of illumination downwardly through the grid 13 and in surrounding relationship relative to the organization.

Figure 11:
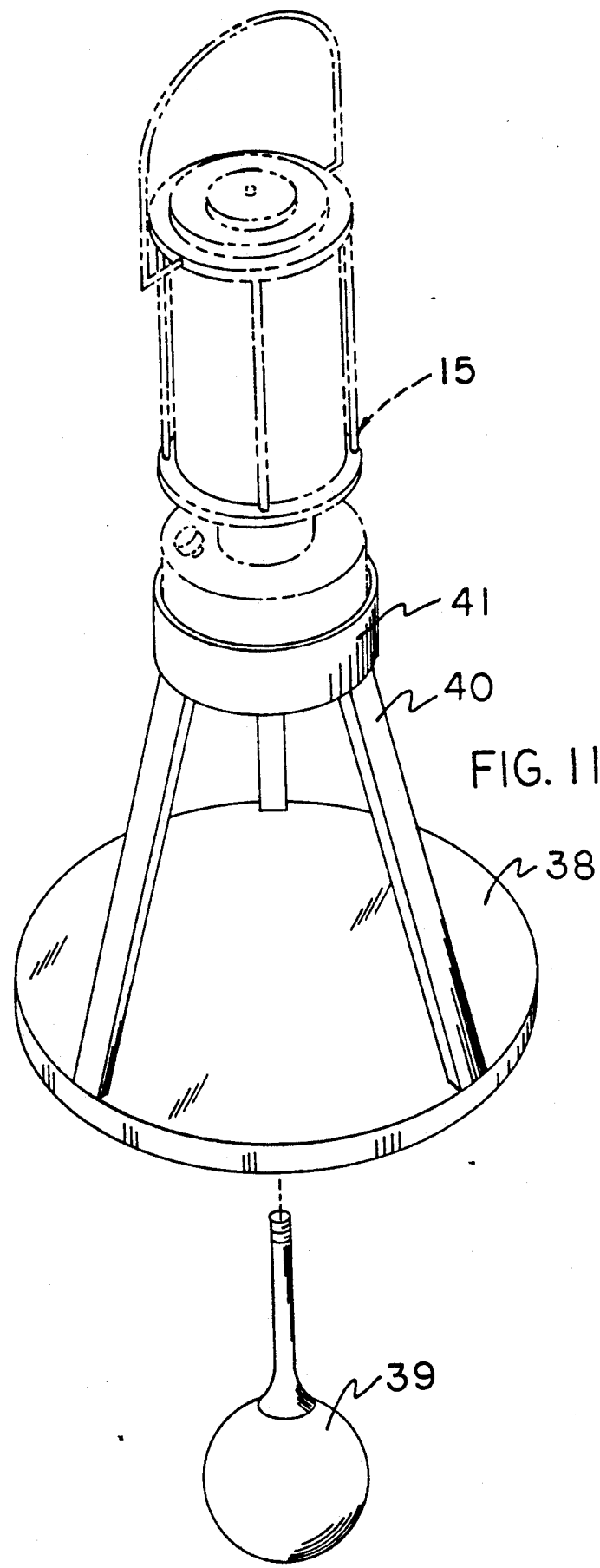
FIG. 11 is an isometric illustration of a modified aspect of the invention.

The FIG. 11 is arranged to include a transparent disc 38 mounting a counterweight 39 coaxially and medially of the disc extending therebelow. A tripod support frame 40 has a support cup 41 mounted at an upper distal end thereof for positioning of the lantern 15 therewithin.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lantern float apparatus, comprising,
   a buoyant continuous frame, with the frame having a continuous frame interior wall, and
   a light transmissive support mounted coextensively to the interior wall within the frame, and
   a cylindrical support mount fixedly mounted medially to a top surface of the light transmissive support, and
   a lantern having a lantern base, with the lantern base positioned within the support mount, and the lantern including a top wall, and
   a lantern lens below the top wall.

2. An apparatus as set forth in claim 1 wherein the light transmissive support is a mesh grid permitting illumination and fluid flow therethrough.

3. An apparatus as set forth in claim 2 wherein the lantern top wall includes a top wall mounting bore, and an inverted conical reflector mounted coaxially relative to the lantern and to the support mount, with the inverted conical reflector having an outer reflector surface, and the conical reflector extending laterally beyond the lantern lens, and a mounting fastener directed through a lower distal end of the conical reflector into the mounting bore to secure the conical reflector to the lantern top wall.

4. An apparatus as set forth in claim 3 including a support tube positioned below the mesh grid, and the support mounting coaxially aligned relative to the support mount, with a mesh basket mounted to the support mount coaxially aligned relative to the support tube, and the mesh basket having a basket door pivotally mounted to the mesh basket to permit access interiorly of the mesh basket for positioning bait therewithin.

5. An apparatus as set forth in claim 4 wherein the buoyant frame includes an anchor post directed through the buoyant frame in a spaced parallel relationship relative to the lantern.

6. An apparatus as set forth in claim 5 including at least one support reel mounted to the buoyant frame, the buoyant frame having a frame aperture positioned below the support reel within the buoyant frame, and an anchor line mounted above the support reel directed through the aperture, and an anchor member mounted to the support line below the buoyant frame permitting winding and reeling of the anchor member relative to the support reel.

7. An apparatus as set forth in claim 6 including a further illumination member arranged for selective positioning within the support mount upon removal of the lantern relative to the support mount, wherein the illumination member includes a support plate, the support plate having a transparent trough wall peripherally about the support plate, and a trough lid mounted over the trough wall, the trough lid formed of transparent material, and a circular bulb mounted within a trough defined within the trough wall, with the circular bulb positioned below the trough lid, and a battery mounted to the support plate, and a switch in electrical communication between the battery and the illumination bulb, and the support mount defined by a predetermined internal diameter, and the trough wall having a predetermined outer diameter, with the predetermined outer diameter substantially equal to the predetermined inner diameter.

* * * * *